United States Patent [19]
Asayama et al.

[11] Patent Number: 6,094,538
[45] Date of Patent: Jul. 25, 2000

[54] AUTOFOCUS LENS BARREL

[75] Inventors: Masateru Asayama, Kawasaki; Tsuneo Watanabe, Tokyo, both of Japan

[73] Assignee: Nikon Corporation, Tokyo, Japan

[21] Appl. No.: 09/313,256

[22] Filed: May 18, 1999

[30] Foreign Application Priority Data

May 22, 1998 [JP] Japan .................................. 10-156896

[51] Int. Cl.[7] .............................. G03B 13/00; G03B 7/02
[52] U.S. Cl. ........................................... 396/137; 359/825
[58] Field of Search .................................. 396/137, 133; 359/823, 824, 825

[56] References Cited

U.S. PATENT DOCUMENTS

| | | | |
|---|---|---|---|
| 5,708,872 | 1/1998 | Fukino | 396/133 |
| 5,918,078 | 6/1999 | Imura | 396/137 |

*Primary Examiner*—W.B. Perkey
*Attorney, Agent, or Firm*—Morgan, Lewis & Bockius LLP

[57] ABSTRACT

A lens barrel capable of selecting an autofocus mode and a manual focus mode includes a fixed drum, a focusing lens movable in an optical axis direction, a driving motor, constructed of a rotor and a stator, for moving the focusing lens, the rotor rotating with respect to the stator when in an autofocus mode, the rotor and the stator rotating together as a whole with respect to the fixed drum when in the manual focus mode, a focusing lens moving mechanism for converting a rotational motion of the rotor into a motion in an optical axis direction and transmitting the optical-axis-directional motion to the focusing lens, and a subassembly constructed of a manual focus ring, a connection member for connecting the stator to the manual focus ring, and an elastic member, provided between the manual focus ring and the connection member, for making the manual focus ring and the connection member frictionally engaged with each other.

5 Claims, 6 Drawing Sheets

AUTOFOCUS LENS BARREL

This application claims the benefit of Japanese Application No. 10-156896 which is hereby

BACKGROUND OF THE INVENTION

1. Field of the Invention

The present invention relates generally to an autofocus lens barrel attached to a camera etc and, more particularly, to a technology capable of easily and precisely controlling a torque between a manual focus ring and a connecting member.

2. Related Background Art

A camera is fitted with various types of lens barrels which may be exemplified by, as a beginning, a unifocal lens barrel and a zoom lens barrel, and further a wide-angle lens barrel and a telephoto lens barrel etc. The lens barrel includes a plurality of lens units each consisting of a single or a plurality of optical lenses, and focusing is executed by properly changing a relative distance between the lens units. In recent years, a so-called autofocus camera among the cameras in a comparatively low price zone has an autofocus mode in which the focusing is implemented by the camera itself in addition to a manual focus mode in which a photographer himself or herself performs the focusing by rotating a manual focus ring provided on an outer peripheral surface of the lens barrel, and therefore widely prevails.

In the autofocus camera, the camera body incorporates a focusing control device composed of a microcomputer and a CCD sensor etc, wherein an electric motor incorporated in the lens barrel or the camera is rotationally driven corresponding to a distance to a subject, and a rotational force thereof is transmitted to a focusing optical system moving device in the lens barrel. The focusing optical system moving device is, though various types of focusing optical system moving devices are known, as illustrated in FIG. 6, in most cases constructed of a focus rotary lever 61 fixed to a rotor holder 39 of an electric motor (a ultrasonic motor) 31, and a lens unit holding ring 17 connected via a cam mechanism 101 to the focus rotary lever 61. In this type of lens barrel, upon supplying the ultrasonic motor 31 with a drive current when in autofocusing, the focus rotary lever 61 rotates together with the rotor 41 (and the rotor holder 39 as well), and the lens unit holding ring 17 moves back and forth with an operation of the cam mechanism 101. Note that the ultrasonic motor 31 is rotatably fitted on an outer peripheral surface of an inner fixed drum 15, and frictionally engages with the inner fixed drum 15 with a predetermined slide torque in order to resist reaction given when driving the lens unit holding ring 17. Referring to FIG. 6, the numeral 67 designates a stopper for restricting a rotation of the focus rotary lever 61, and reference symbol L represents an optical axis.

On the other hand, the manual focus ring 7 is rotatably fitted on an outer fixed drum 11, and a connection ring 83 is brought into contact with a rear edge surface of the manual focus ring 7 through a wave washer 103. A pair of inner and outer adjustment screw rings 105, 107 are provided at a rear portion of the connection ring 83. A rear end face of the inner adjustment screw ring 105 is in contact with rollers 109 held at an outer face of a stator holder 35. In FIG. 6, a member designated by the numeral 111 is a spacer for regulating a relative distance of both the adjustment screw rings 105 and 107. The rollers 109 each is in contact with the inner adjustment screw ring 105 at a front face and with a front end face of a rear fixed cylinder 113 at a rear face.

Accordingly, if the photographer rotates the manual focus ring 7, the rollers 109 roll along the front end face of the rear fixed cylinder 113, whereby the ultra sonic motor 31 and the focus rotary lever 61 rotate to perform a manual focusing. The manual focus ring 107, which is in friction contact with the connection ring 83 by a spring force of the wave washer 103, is so set that a slide torque thereof is larger than that between the ultrasonic motor 31 and the inner fixed cylinder 15.

The conventional autofocus lens barrel has a problem that an adjustment of a slide torque between the manual focus ring 7 and the connection ring 83 is difficult, which causes reduced production efficiency as well as increased production cost.

The slide torque between the manual focus ring 7 and the connection ring 83 has been adjusted by changing the height of the compressed wave washer 103 (that is, a gap t between the manual focus ring 7 and the connection ring 83), in accordance with the following procedures. First, a spacer 111 having a standard thickness is used and the inner and outer adjustment rings 105, 107 are fastened and positioned, thereafter the ultrasonic motor 31, the rear fixed cylinder 113 and others are assembled provisionary. Next the manual focus ring 7 is rotated to conduct the tests that the ultrasonic motor rotates smoothly within the focus region and that the ultrasonic motor 31 does not rotate after the focus rotary lever 61 is brought in contact with the stopper 67. The former test is for confirming the function of the manual focus ring 7, and the latter test is for preventing damage of the ultrasonic motor 31. In more detail, in the case where the ultrasonic motor 31 rotates even after the focus rotary lever 61 is brought in contact with the stopper 67, the stator 37 will make a relative rotation to the rotor 41 stopped with the focus rotary lever 61, which will damage the contacting surfaces of both of them and remarkably reduce the life of the ultrasonic motor 31.

Upon confirming inconvenience in both of tests, an assembly worker removes a rear fixed drum 113 and the ultrasonic motor 31 out of the lens barrel, and thereafter exchange a spacer 111 by pulling the adjustment screw rings 105, 107 out. This operation, however, requires a great number of steps and much time. Further, the assembly worker, after exchanging the spacer 111, again performs the above test by tentatively assembling the lens barrel once again. If the inconvenience is not obviated, however, the rear fixed drum 113 and the ultrasonic motor 31 must be repeatedly attached and detached. The present inventors made an attempt to reduce a dimensional tolerance of each of the parts in order to solve this problem. This could not, however, be attained because of a large number of components of the ultrasonic motor 31.

SUMMARY OF THE INVENTION

It is a primary object of the present invention, which was devised under such circumstances, to provide an autofocus lens barrel capable of easily and precisely controlling a slide torque between a manual focus ring and a connection member.

To accomplish the above object, according to one aspect of the present invention, an autofocus lens barrel is capable of selecting an autofocus mode in which a focusing control device controls a drive of a focusing optical system through an electric motor, and a manual focus mode in which a photographer drives the focusing optical system through a manual focus ring. The lens barrel comprises a focusing optical system moving device, constructed of an interlocking member and a focusing optical system holding member connected via a cam mechanism to the interlocking member, for moving the focusing optical system holding member along an optical axis with respect to a fixed drum in accordance with a rotational input to the interlocking member, an electric motor having a rotor connected to the interlocking member of the focusing optical system moving device, and a manual focus ring connected to the electric motor through a connection member, and frictionally engaging with the connection member by a pressing force of an elastic member. The connection member, the elastic member and the manual focus ring constitute a subassembly, and the pressing force of the elastic member can be controlled in a state of the subassembly.

According to another aspect of the present invention, a lens barrel capable of selecting an autofocus mode and a manual focus mode, comprises a fixed drum, a focusing lens movable in an optical axis direction, a driving motor, constructed of a rotor and a stator, for moving the focusing lens, the rotor rotating with respect to the stator when in an autofocus mode, the rotor and the stator rotating together as a whole with respect to the fixed drum when in the manual focus mode, a focusing lens moving mechanism for converting a rotational motion of the rotor into a motion in an optical axis direction and transmitting the optical-axis-directional motion to the focusing lens, and a subassembly including a manual focus ring, a connection member for connecting the stator to the manual focus ring, and an elastic member, provided between the manual focus ring and the connection member, for making the manual focus ring and the connection member frictionally engaged with each other.

According to the present invention, the slide torque between the manual focus ring and the connection member can be controlled in the state of the subassembly before assembling the lens barrel. Further, after the assembly, the slide torque can be also controlled by removing only the subassembly.

In the autofocus lens barrel described above, the manual focus ring may be composed of a front manual focus ring and a rear manual focus ring which are screwed to each other, and the connection member and said elastic member may be interposed between the front manual focus ring and the rear manual focus ring.

According to the present invention, for example, when the front manual focus ring and the rear manual focus ring are screwed to each other, a compression quantity of the elastic member can be easily controlled by increasing or decreasing a fastening quantity of these two rings.

According to the present invention, the manual focus ring, the elastic member and the connection member constitute the subassembly, and it is therefore feasible to accurately control the slide torque between the manual focus ring and the connection member before assembling the lens barrel. Further, the re-control thereof after assembling the lens barrel is highly facilitated, thereby reducing the number of steps and the time which are required for assembling the lens barrel. This makes it possible to reduce a cost for the product and enhance a productivity thereof.

DESCRIPTION OF THE PREFERRED EMBODIMENT

Figure 1:
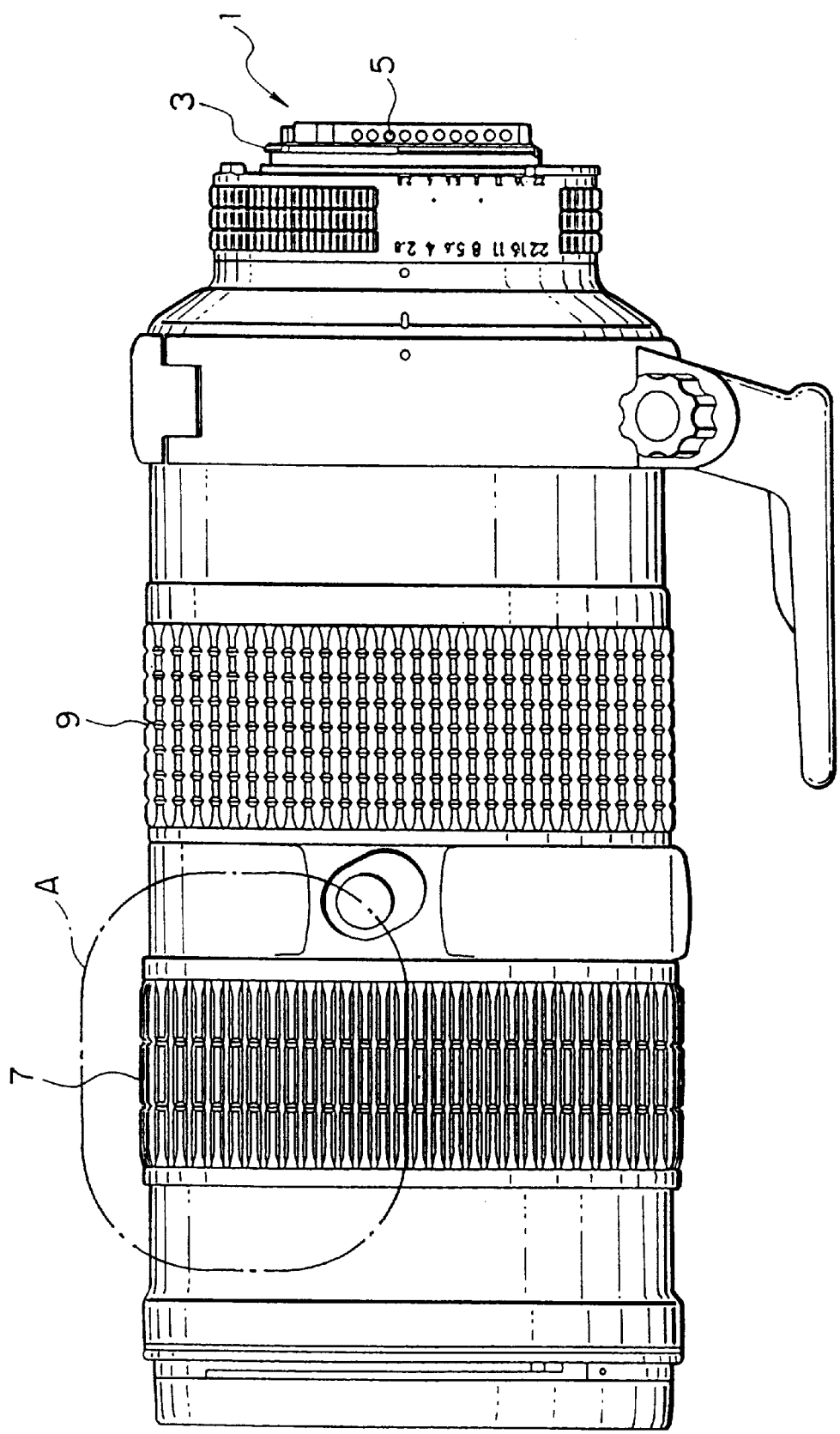
FIG. 1 is a side view showing an autofocus lens barrel according to the present invention.
Figure 2:
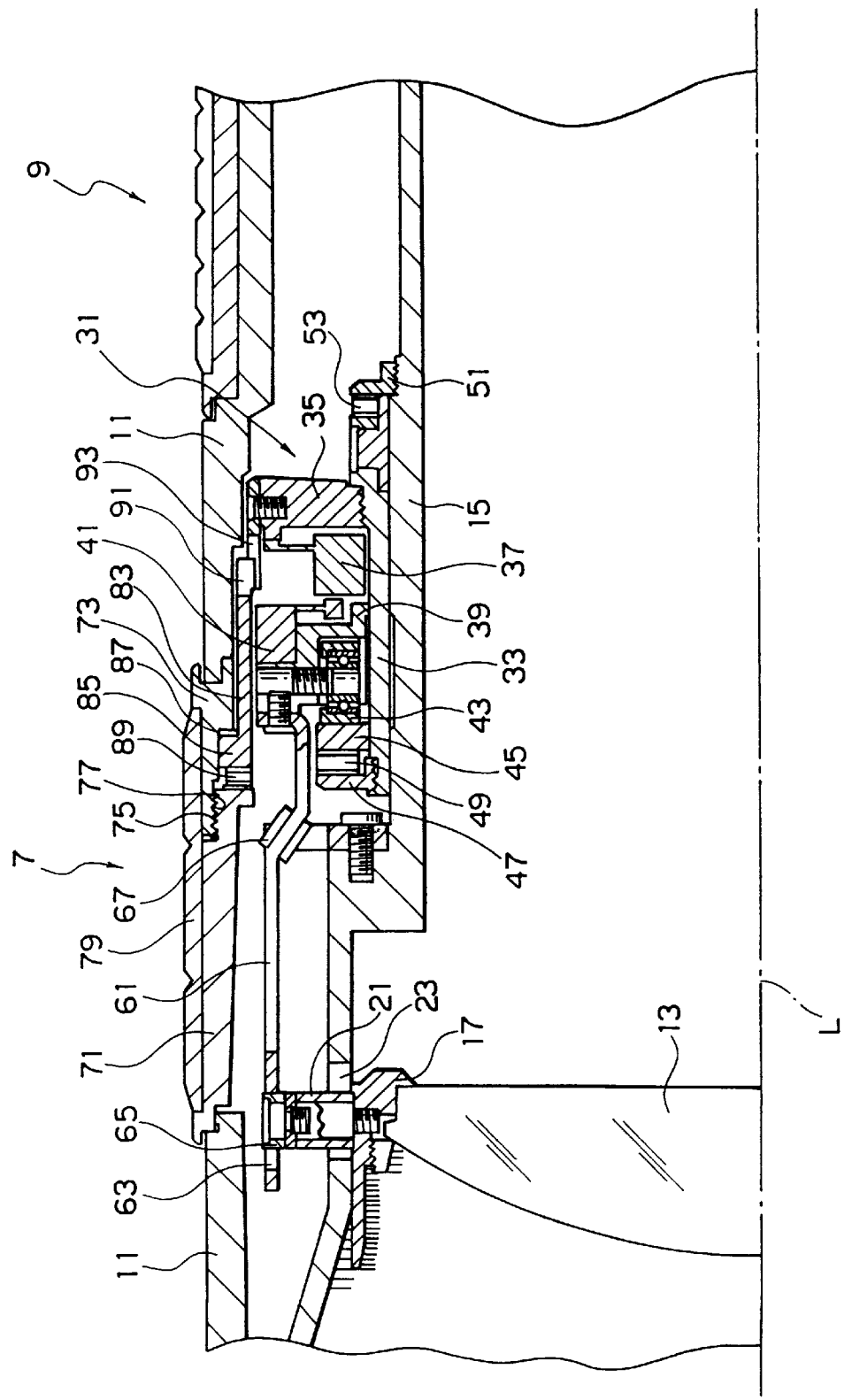
FIG. 2 is an enlarged vertical sectional view showing a portion A in FIG. 1.

One embodiment of the present invention will hereinafter be described with reference to the accompanying drawings. FIG. 1 is a side view showing an autofocus lens barrel (which is hereinafter simply referred to as a lens barrel) according to the present invention. FIG. 2 is an enlarged vertical sectional view showing a portion A in FIG. 1.

Referring first to FIG. 1, a member designated by the numeral 1 is a mount used for attaching the lens barrel to a camera (not shown). A plurality of bayonet lugs 3 are provided on an outer periphery of the mount 1, of which a rear portion is formed with an electric contact point 5 supplied with a driving current and a control signal from the camera. Further, the lens barrel includes a manual focus ring 7 and a zoom ring 9 which are provided at front and rear portions thereof. A photographer holds and rotates these rings 7, 9, thus executing manual focusing and zooming.

As shown in FIG. 2, a body of the lens barrel is constructed of an outer fixed drum 11 serving as a lens barrel outer shell, and an inner fixed drum 15 for holding a focus lens unit 13 and a zoom lens unit (unillustrated) etc. The focus lens unit 13 is held by a lens unit holding ring (a focusing optical system holding member) 17 fitted inside the inner fixed drum 15. The focus lens unit 13 slides back and forth on an inner peripheral surface of the inner fixed drum 15 together with the lens unit holding ring 17. A plurality of cam followers 21 are rotatably fitted on an outer peripheral surface of the lens unit holding ring 17, and engage with lead grooves 23 formed along the inner fixed drum 15.

An annular ultrasonic motor 31 is provided between the outer and inner fixed drums 11, 15. The ultrasonic motor 31 is composed of a motor base 33 rotatably attached to the inner fixed drum 15, a stator holder 35 fixed to the motor base 33, a stator 37 held by the stator holder 35, a rotor 41 fixedly held by a rotor holder 39, a plurality of rollers 43 held at a front portion of the rotor holder 39, a guide ring 45 on which the rollers 43 roll, and a wave washer 49 interposed between the guide ring 45 and a stopper ring 47 and pressing the rotor 41 against the stator 37. A member denoted by the numeral 51 in FIG. 2 is a presser ring for fixing the ultrasonic motor 31 to the inner fixed drum 15. A member designated by the numeral 53 in FIG. 2 is a wave washer for producing a predetermined slide torque between the inner fixed drum 15 and the motor base 33.

A focus rotary lever 61 serving as an interlocking member in this embodiment is fixedly fastened by a screw to a front end of the rotor holder 39. The focus rotary lever 61 has an elliptical engagement hole 63 formed at the front edge thereof and elongated in the front-and-rear directions. A roller 65 attached to a front edge of the cam follower 21 engages with the engagement hole 63. Upon inputting the driving current to the ultrasonic motor 31 from the electric contact point 5 shown in FIG. 1, the rotor 41 rotates either in a forward rotating direction or in a reverse rotating direction, and the rotations thereof are transmitted via the focus rotary lever 61 to the cam followers 21. The cam followers 21 are thereby driven back and forth along the lead grooves 23, and the focus lens unit 13 moves together with the lens unit holding ring 17 along the optical axis L, thus actualizing the autofocusing. At this time, the stator 37, the stator holder 35 and the motor base 33 remain halted. A member denoted by the numeral 67 in FIG. 2 is a stopper for preventing the focus rotary lever 61 from deviating from a focus region.

Figure 3:
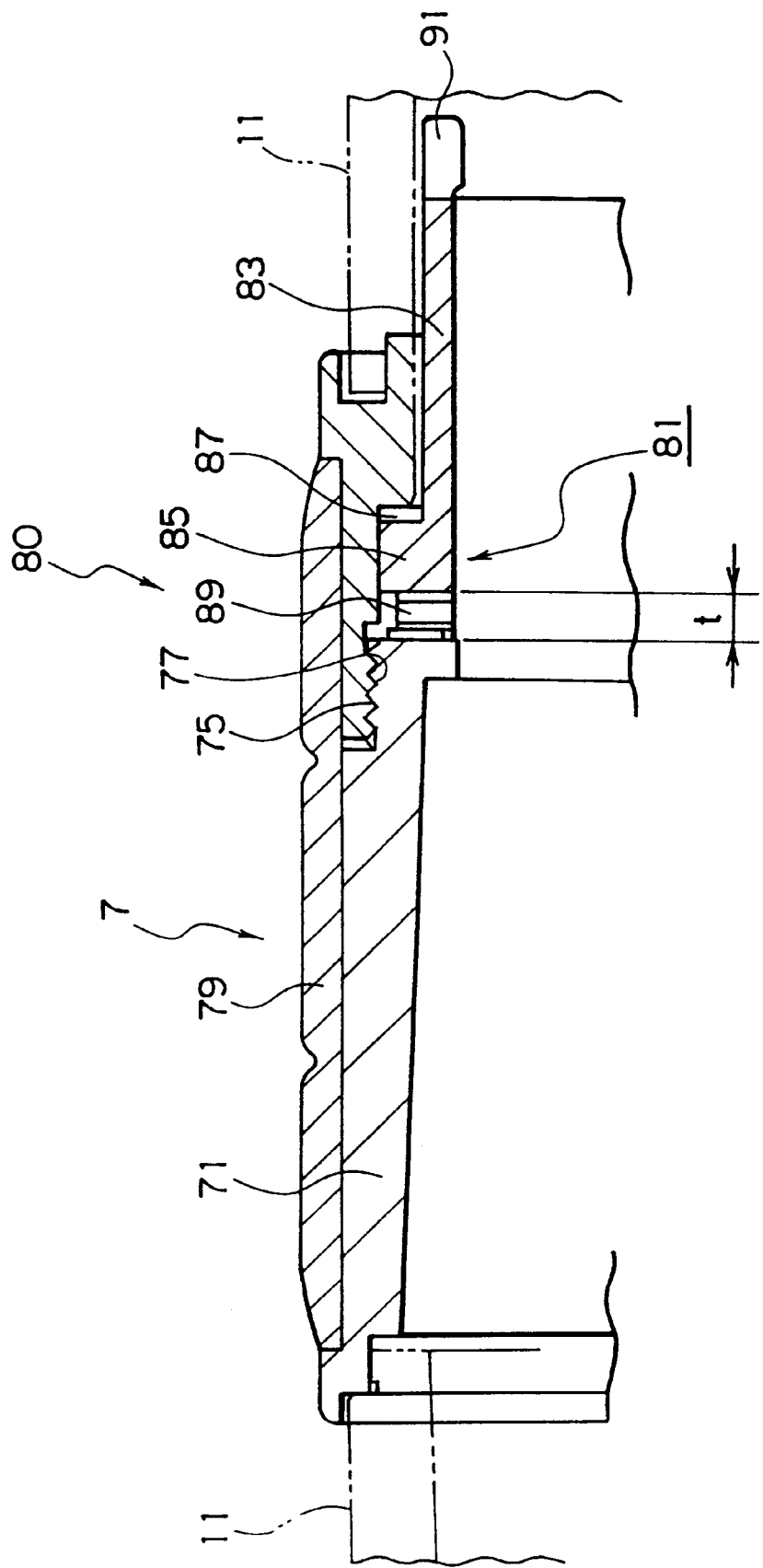
FIG. 3 is a vertical sectional view showing a subassembly of a manual focus ring and a connection ring.
Figure 4:
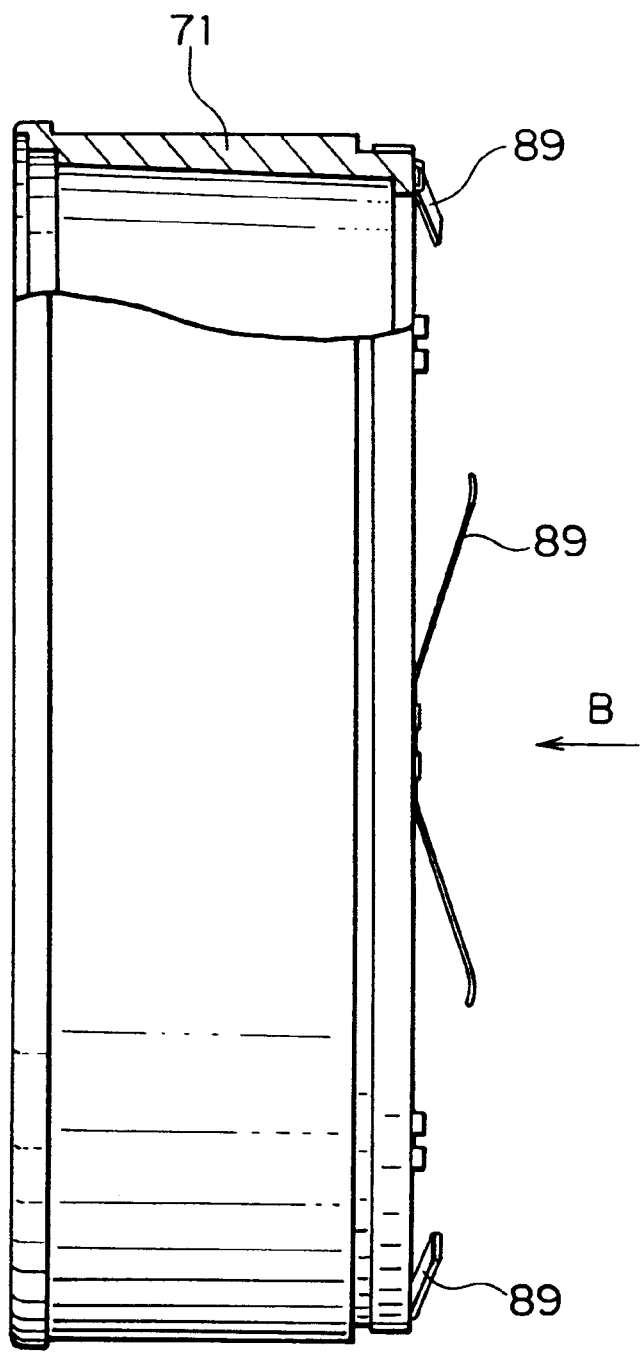
FIG. 4 is a partially sectional side view of the manual focus ring.
Figure 5:
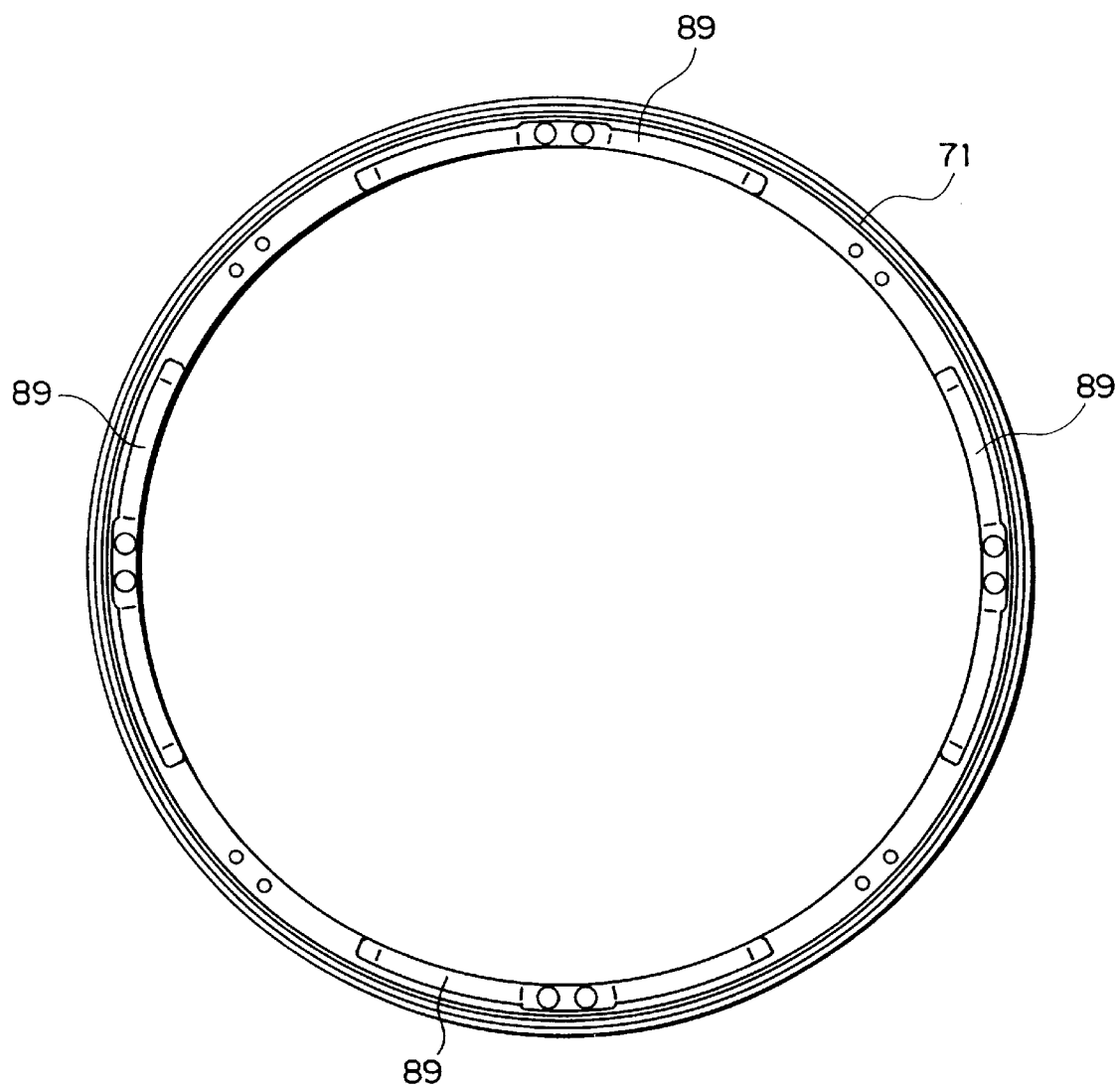
FIG. 5 is a view taken along the arrow line B in FIG. 4.
Figure 6:
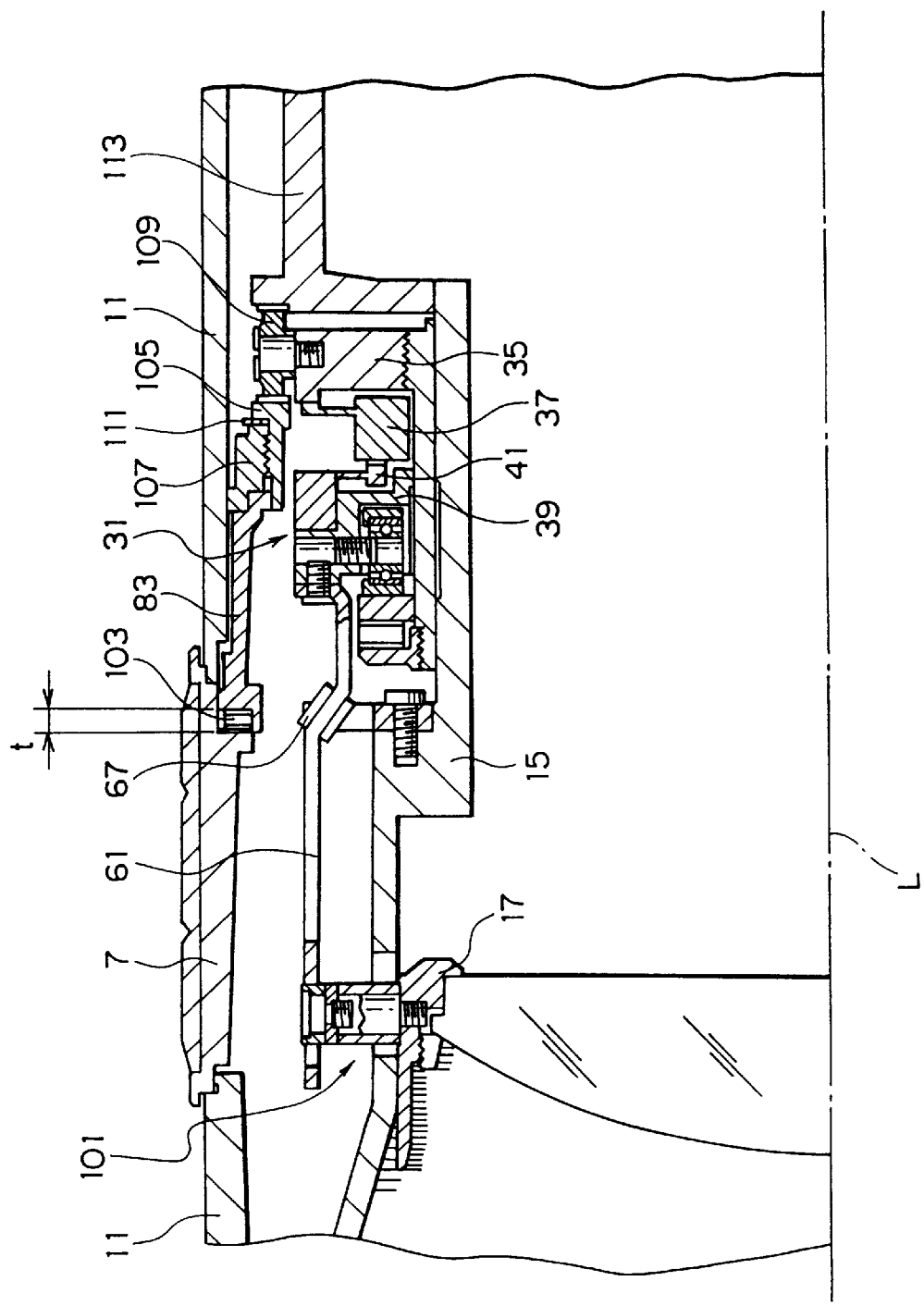
FIG. 6 is a vertical sectional view showing a principal portion of an autofocus lens barrel in the prior art.

On the other hand, the manual focus ring 7 is constructed of a front manual focus ring 71 and a rear manual focus ring 73, and a male screw at a rear portion of the front manual focus ring 71 is screwed in a female screw 77 at a front edge of the rear manual focus ring 73, whereby the two manual focus rings 71, 73 are combined into one united body. A member designated by the numeral 79 in FIG. 2 is a rubber ring for preventing a slippage of a hand when manipulated, and is covered over outer peripheral surfaces of the two manual focus rings 71, 73. As shown in a subassembly 80 in FIG. 3, an annular air gap 831 is formed between the front manual focus ring 71 and the rear manual focus ring 73. A spacer 87 and a front flange 85 of a connection ring 83 defined as a connection member in this embodiment, are provided in the air gap 81. Further, as illustrated in FIGS. 4 and 5 (a view taken along the arrow line B in FIG. 4), four sets of flat plate springs 89 each assuming a V-shape and having two pieces expanding in a circumferential direction and extending backward are fixed at an interval of approximately equal angle to a rear edge surface of the front manual focus ring 71. These plate springs 89 bias backward the front flange 85 of the connection ring 83.

A plurality of engagement protrusions 91 extend backward from a rear edge surface of the connection ring 83, and engage with an engagement key 93 fixed to an upper surface of the stator holder 35. Accordingly, when the photographer rotates the manual focus ring 7, a rotation thereof is transmitted via the engagement key 93 and the stator holder 35 to the ultrasonic motor 31, and the ultrasonic motor 31 rotates as a whole including the stator 37 and the rotor 41, with the result that the focus lens unit 13 moves along the optical axis L in the same procedure as when autofocusing. On this occasion, for preventing the ultrasonic motor 31 from being damaged (such as abrasion on a slide surface between the stator 37 and the rotor 41) while attaining a smooth operation, the slide torque between the manual focus ring 7 and the connection ring 83 must be controlled larger than a slide torque between the inner fixed drum 15 and the motor base 33 but smaller than a slide torque between the stator 37 and the rotor 41.

A procedure of controlling the slide torque between the manual focus ring 7 and the connection ring 83, will hereinafter be explained.

In this embodiment, the front flange 85 of the connection ring 83 is provided in the air gap 81 described above, and hence an assembly worker makes the front manual focus ring 71 and the rear manual focus ring 73 close to and separate from each other, whereby a compression quantity of the plate springs 89 fixed to the front manual focus ring 71 changes. The slide torque between the manual focus ring 7 and the connection ring 83 is thus controlled. Further, a thickness t of the plate spring 89 after the compression is set by changing an axial distance between the front manual focus ring 71 and the rear manual focus ring 73, which involves the use of spacers 87 having a variety values of thickness.

For example, the assembly worker, to start with, assembles the subassembly 80 of the manual focus ring 7 and the connection ring 83 by use of the spacer 87 having the standard thickness, thereafter sets this subassembly 80 in a predetermined test device, and makes a test as to whether or not the slide torque falls within prescribed values. If it proves from this test that the slide torque is excessively large or small, the assembly worker repeatedly reassembles the subassembly 80 and repeatedly performs the test for the slide torque till the slide torque falls within the prescribed values by use of the spacers 87 each having the different thickness. The slide torque between the manual focus ring 7 and the connection ring 83 can be precisely controlled before being incorporated into the lens barrel by taking the procedure described above, whereby an assembling workability and a productivity are enhanced remarkably as compared with those of the conventional products.

Now, after assembling the lens barrel, it might happen that the slide torque between the inner fixed drum 15 and the motor base 33 is too large, or that the slide torque between the stator 37 and the rotor 41 is too small. In these cases, there is caused a relative slide between the manual focus ring 7 and the connection ring 83 even by rotating the manual focus ring 7, with the result that the ultrasonic motor 31 does not rotate at all. Alternatively, the motor base 33 is rotated even after the focus rotary lever 61 impinges upon the stopper 67, and it follows that there is also caused a relative slide between the stator 37 and the rotor 41. If such an inconvenience arises, the assembly worker removes the subassembly 80 from the lens barrel, and properly exchange the spacer 87, thus obviating the inconvenience.

The embodiment has been specifically discussed so far, and the explanation thereof comes to an end. The mode of the present invention is not, however, limited to the embodiment discussed above. For example, in the embodiment described above, the plurality of plate springs are used as the elastic members interposed between the manual focus ring and the connection member, however, an annular wave washer etc may also be used. Moreover, in the embodiment discussed above, the present invention is applied to the zoom type autofocus lens barrel incorporating the ultrasonic motor but may also be applied to lens barrel using other types of electric motors and to a unifocal type autofocus lens barrel. Furthermore, the specific construction of the focusing mechanism etc is not limited to what has been exemplified in the embodiment discussed above but may be properly changed depending on the convenience in terms of design.

What is claimed is:

1. An autofocus lens barrel capable of selecting an autofocus mode in which a focusing control device controls a drive of a focusing optical system through an electric motor, and a manual focus mode in which a photographer drives said focusing optical system through a manual focus ring, said lens barrel comprising:

a focusing optical system moving device, constructed of an interlocking member and a focusing optical system holding member connected via a cam mechanism to said interlocking member, for moving said focusing optical system holding member along an optical axis with respect to a fixed drum in accordance with a rotational input to said interlocking member;

an electric motor having a rotor connected to said interlocking member of said focusing optical system moving device; and a manual focus ring connected to said electric motor through a connection member, and frictionally engaging with said connection member by a pressing force of an elastic member, wherein said connection member, said elastic member and said manual focus ring constitute a subassembly, and the pressing force of said elastic member can be controlled in a state of said subassembly.

2. An autofocus lens barrel according to claim 1, wherein said manual focus ring is composed of a front manual focus ring and a rear manual focus ring which are screwed to each other, and said connection member and said elastic member are interposed between said front manual focus ring and said rear manual focus ring.

3. A lens barrel capable of selecting an autofocus mode and a manual focus mode, comprising:

a fixed drum;

a focusing lens movable in an optical axis direction;

a driving motor, constructed of a rotor and a stator, for moving said focusing lens, said rotor rotating with respect to said stator when in an autofocus mode, said rotor and said stator rotating together as a whole with respect to said fixed drum when in the manual focus mode;

a focusing lens moving mechanism for converting a rotational motion of said rotor into a motion in an optical axis direction and transmitting the optical-axis-directional motion to said focusing lens; and a subassembly constructed of a manual focus ring, a connection member for connecting said stator to said manual focus ring, and an elastic member, provided between said manual focus ring and said connection member, for making said manual focus ring and said connection member frictionally engaged with each other.

4. A lens barrel according to claim 3, wherein said subassembly is detachably attached as a whole to said fixed drum.

5. A lens barrel according to claim 3, wherein said manual focus ring is composed of a front manual focus ring and a rear manual focus ring which are screwed to each other, and said connection member and said elastic member are interposed between said front manual focus ring and said rear manual focus ring.

* * * * *